US010226945B2

(12) United States Patent
Kubota et al.

(10) Patent No.: US 10,226,945 B2
(45) Date of Patent: Mar. 12, 2019

(54) TAPE PRINTING DEVICE

(71) Applicant: SEIKO EPSON CORPORATION, Tokyo (JP)

(72) Inventors: Tomoyuki Kubota, Matsumoto (JP); Taishi Sasaki, Matsumoto (JP); Akihiro Shintani, Matsumoto (JP); Haruki Sugawara, Matsumoto (JP); Naoya Nishimura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 18 days.

(21) Appl. No.: 15/560,988

(22) PCT Filed: Feb. 18, 2016

(86) PCT No.: PCT/JP2016/000865
§ 371 (c)(1),
(2) Date: Sep. 22, 2017

(87) PCT Pub. No.: WO2016/152014
PCT Pub. Date: Sep. 29, 2016

(65) Prior Publication Data
US 2018/0050546 A1    Feb. 22, 2018

(30) Foreign Application Priority Data

Mar. 23, 2015  (JP) ................. 2015-059221

(51) Int. Cl.
*B41J 3/36* (2006.01)
*B41J 3/407* (2006.01)
(Continued)

(52) U.S. Cl.
CPC ............... *B41J 3/4075* (2013.01); *B41J 2/32* (2013.01); *B41J 3/36* (2013.01); *B41J 3/39* (2013.01); *B41J 29/00* (2013.01); *G06F 3/0219* (2013.01)

(58) Field of Classification Search
CPC ..... B41J 3/00; B41J 3/36; B41J 3/4075; B41J 5/10; B41J 3/39; G06F 3/0219; G06F 3/018
See application file for complete search history.

(56) References Cited

U.S. PATENT DOCUMENTS 7,067,735 B2 *  6/2006  Murata ................. B41J 3/4075
                                                  174/50
8,366,264 B2 *  2/2013  Inaba ................... B41J 3/4075
                                                  347/109
(Continued)

FOREIGN PATENT DOCUMENTS

CN      101678682 A      3/2010
JP      2000-177181 A    6/2000
(Continued)

OTHER PUBLICATIONS

Computer-generated translation of JP 2011-77744, published on Apr. 2011.*
(Continued)

*Primary Examiner* — Huan Tran
(74) *Attorney, Agent, or Firm* — Foley & Lardner LLP (57) ABSTRACT

A tape printing device that is vertically long and can be operated by being handheld includes a main key operating portion configured with a plurality of groups of keys 215, 217, and 219 on a front surface, in which, among the plurality of groups of keys 215, 217, and 219, a group of keys 215 having a high frequency of operations is disposed at a position near a gravity center portion in a longitudinal direction, and the groups of keys 217 and 219 having a low frequency of operations are disposed at a position distant from the gravity center portion in the longitudinal direction.

13 Claims, 9 Drawing Sheets

(51) Int. Cl.
*B41J 3/39* (2006.01)
*B41J 29/00* (2006.01)
*B41J 2/32* (2006.01)
*G06F 3/02* (2006.01)

(56) References Cited

U.S. PATENT DOCUMENTS

| | | | |
|---|---|---|---|
| 2002/0155868 A1* | 10/2002 | Koshima | A63F 13/06 463/1 |
| 2005/0056444 A1* | 3/2005 | Murata | B41J 3/4075 174/50 |
| 2009/0016795 A1* | 1/2009 | Caveney | B41J 3/4075 400/88 |
| 2010/0040399 A1 | 2/2010 | Van Pottelberghe et al. | |
| 2010/0302334 A1 | 12/2010 | Inaba et al. | |

FOREIGN PATENT DOCUMENTS

| | | |
|---|---|---|
| JP | 2006-140313 A | 6/2006 |
| JP | 2010-274638 A | 12/2010 |
| JP | 2011-077744 A | 4/2011 |
| JP | 4908493 B | 1/2012 |
| JP | 2013-117874 A | 6/2013 |

OTHER PUBLICATIONS

International Search Report issued in related International Patent Application No. PCT/JP2016/000865, completed Mar. 14, 2016.

* cited by examiner

FIG. 9 ard keys having a relatively high frequency of operations —

TAPE PRINTING DEVICE

TECHNICAL FIELD

The present invention relates to a tape printing device that can be operated by being handheld.

BACKGROUND ART

In the related art, as this tape printing device, a handheld thermal transfer printer has been known (refer to PTL 1).

The handheld thermal transfer printer is provided with a cassette in which a label material and a thermal transferring ribbon are mounted, and a printer main body in which the cassette is detachably mounted and which produces a label by performing printing on the cassette. A cassette bay in which the cassette is mounted, a display, and a keypad are sequentially disposed on a front surface of the printer main body from the tip end side. A print head, a driving roller, and a connector are disposed on the cassette bay. In addition, a cutter lever is disposed near the cassette bay. An interface port is disposed on a right side surface of the printer main body, and a power line adapter is disposed on a front side surface. Also, a chargeable battery is provided inside the printer main body.

A user holds the printer main body in hand by putting a hand on a rear side of the keypad, and performs inputting and editing using the keypad while seeing the display. After performing inputting and editing, if printing is instructed, the driving roller and the print head are driven, and printing is performed on the label material which is fed out from the cassette. In addition, a printed part of the label material is cut by operating the cutter lever, and thus a label is produced.

CITATION LIST

Patent Literature

PTL 1: Japanese Patent No. 4908493

SUMMARY OF INVENTION

Technical Problem

In such a handheld thermal transfer printer (printer) of the related art, a mechanism portion for performing printing including a print head, a driving roller, and the like is disposed around a cassette bay. In the mechanism portion, a frame thereof is assembled with a base, and the mechanism portion is the heaviest part in the printer. Therefore, the gravity center of the printer is set to be nearer the cassette bay than an intermediate of a longitudinal direction even in a state in which a battery is mounted, and is positioned near a display. Meanwhile, regarding a keypad provided on a front surface of a printer main body, a group of function keys thereof is disposed at a tip of the cassette bay side, and a group of character keys is disposed on a front side. That is, the group of function keys is disposed near the gravity center of the printer, and the group of character keys is disposed distant therefrom.

In a case in which a user holds the printer in hand by putting a hand on a rear side of the keypad, from a viewpoint of a weight balance of the entire body, a rear side of the group of function keys is naturally supported (grabbed). Therefore, in a case in which characters are input using the group of character keys, keys on the front side of a palm of the hand supporting the printer is stroked, and thus it is difficult to perform a push-button operation of the character keys. In this case, the hand corresponding to the group of character keys may move to the front side, but if the hand moves like that, the palm of the hand is separated from the gravity center of the printer, and thus it is difficult to hold the printer itself at this time (a user feels heavy). Particularly, the group of character keys has a higher frequency of operations than that of the group of function keys, and thus there is a problem in that operability in a handheld operation is entirely deteriorated.

The invention is to provide a tape printing device capable of improving operability in a handheld operation.

Solution to Problem

According to the invention, there is provided a tape printing device that is vertically long and is able to be operated by being handheld including a main key operating portion that is configured with a plurality of groups of keys on a front surface of the tape printing device, in which, among the plurality of groups of keys, a group of keys having a high frequency of operations is disposed at a position near to a gravity center portion in a longitudinal direction of the tape printing device, and a group of keys having a low frequency of operations is disposed at a position distant from the gravity center portion in the longitudinal direction of the tape printing device.

According to the configuration, since the group of keys having the high frequency of operations is disposed at a position near the gravity center portion in the longitudinal direction, a grabbing position to easy to hold in hand when considering a weight balance of the entire body and a grabbing position to easy to hold in hand when key-operating the group of keys having the high frequency of operations can be formed to approximately coincide with each other. Accordingly, in various operations, an operation in which the tape printing device is held in hand by changing one hand to other hand and the like are not necessary, and operability in the handheld operation can be improved. In addition, the group of keys having the high frequency of operations can be operated without changing a gripping position of the tape printing device, and thereby making it possible to prevent the tape printing device from accidentally dropping.

In this case, it is preferable that the tape printing device further include a handheld supporting portion that is a part to be handheld, in which the main key operating portion be disposed on a front surface of the handheld supporting portion, and the group of keys having the high frequency of operations and the group of keys having the low frequency of operations be disposed side by side in the longitudinal direction.

According to the configuration, when the handheld supporting portion is grabbed so as to be supported from the rear side, the group of keys having the high frequency of operations is supported by a part of the finger side from the palm of the hand of the hand that grabs, and the group of keys having the low frequency of operations is supported by a part throughout from the palm to a wrist of the hand. Therefore, the push-button operation of the keys having the high frequency of operations is performed by supporting the device with the part throughout from the palm to the wrist of the hand. Therefore, in a state in which the handheld supporting portion is grabbed, the key operation can be performed without generating uncomfortable feeling.

In addition, it is preferable that the group of keys having the high frequency of operations include a group of character keys, and the group of keys having the low frequency of operations include a group of cursor keys.

According to the configuration, when performing the key operation in the handheld operation of the character keys having the high frequency of operations, operability thereof can be improved.

In this case, it is preferable that a plurality of the character keys constituting the group of character keys be disposed with a gap therebetween, and be each formed to be vertically long.

According to the configuration, in a width direction orthogonal to the longitudinal direction, the entire width of the group of character keys can be narrowed as much as possible. In addition, it is possible to suppress an erroneous operation such as pressing the adjacent keys. Accordingly, the tape printing device which is easy to hold in hand and easy to operate can be provided.

In addition, it is preferable that, regarding character display of each key in the main key operating portion, coloring be differently performed on the plurality of groups of keys.

According to the configuration, the types of the group of keys can be displayed by the colors of the character display, and operation error can be suppressed.

Meanwhile, it is preferable that the tape printing device further include a cartridge mounting portion on which a tape cartridge is detachably mounted, an opening/closing lid that opens and closes the cartridge mounting portion, a displaying portion that is provided in the opening/closing lid, and a sub-key operating portion that is provided in the opening/closing lid.

According to the configuration, the cartridge mounting portion and the displaying portion can be overlapped and disposed, and the displaying portion and the sub-key operating portion can be disposed on a narrow area. Therefore, in the tape printing device which can be operated by being handheld, it is possible to achieve improvement of operability and to make the device compact.

In this case, it is preferable that a hinge for opening and closing the opening/closing lid include a rotation load resisting blockage due to a weight itself of the opening/closing lid.

According to the configuration, even when the finger releases from the opened opening/closing lid, the opening/closing lid is not blocked due to the weight itself. That is, in attaching and detaching operation of the tape cartridge, regardless of a posture of the handheld tape printing device, the tape cartridge can be attached and detached by one hand. Therefore, operability with respect to attachment and detachment of the tape cartridge can be improved.

In addition, it is preferable that the opening/closing lid include a finger hooking portion for opening and closing, and the finger hooking portion protrude from a front surface of the displaying portion and a front surface of the sub-key operating portion.

According to the configuration, a finger easily hooks the finger hooking portion, and opening and closing operation of the opening/closing lid can be smoothly performed. In addition, the protruding finger hooking portion is capable of functioning as a protector for protecting the displaying portion and the sub-key operating portion.

DESCRIPTION OF EMBODIMENTS

Hereinafter, a tape printing device according to an embodiment of the invention will be described with respect to attached drawings. The tape printing device produces, for example, a label for indicating a system of a cable in a terminal board, and is formed in a small and vertically long shape so as to be operated by being handheld at a workplace. In the tape printing device, a tape cartridge in which a printing tape is mounted is detachably mounted, and the tape printing device performs printing while feeding the printing tape from the tape cartridge, and produces a label by cutting a printed part of the printing tape.

[Entire Configuration of Tape Printing Device]

Figure 1:
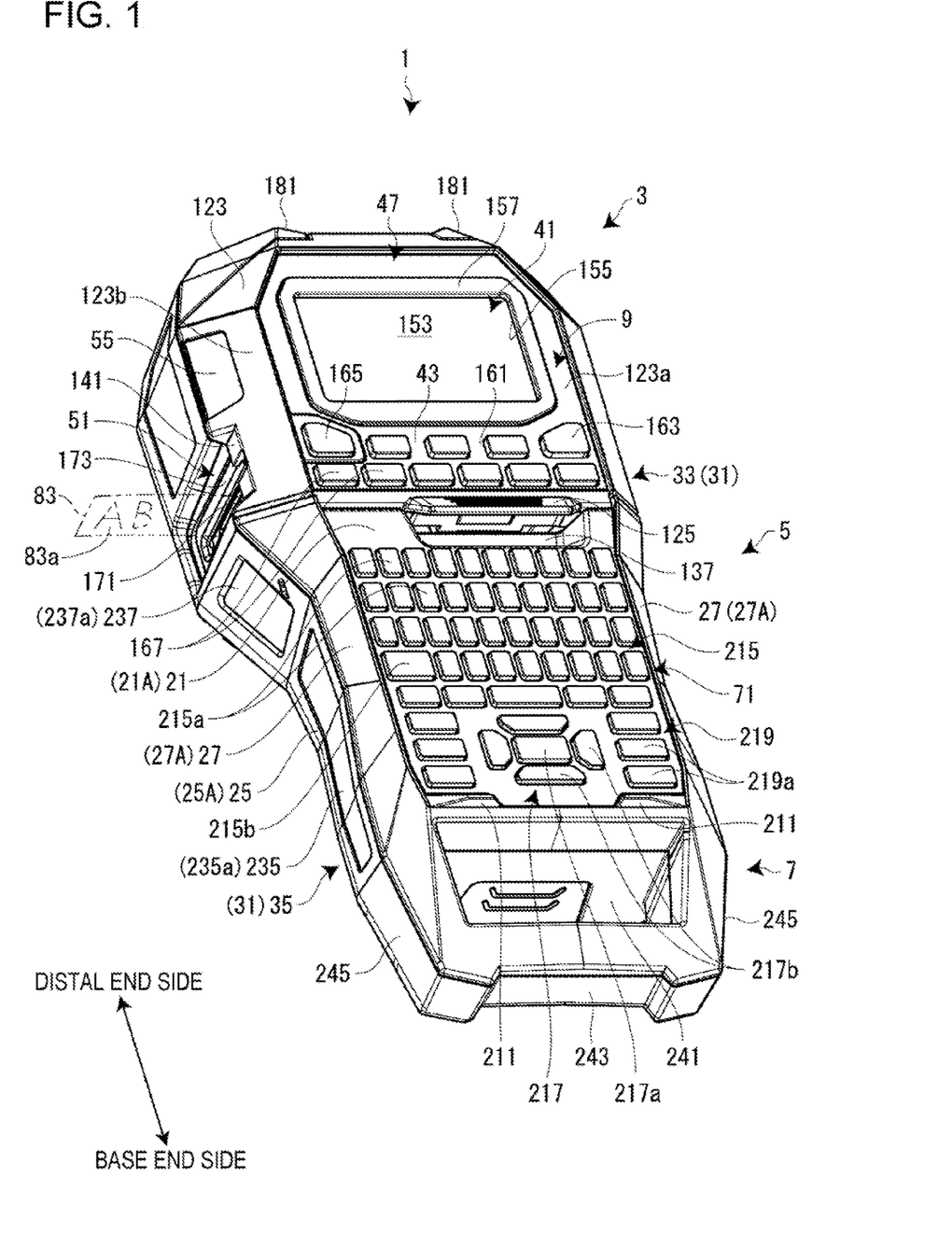
FIG. 1 is an exterior perspective view of a tape printing device of an embodiment when obliquely seen from a left top.
Figure 2:
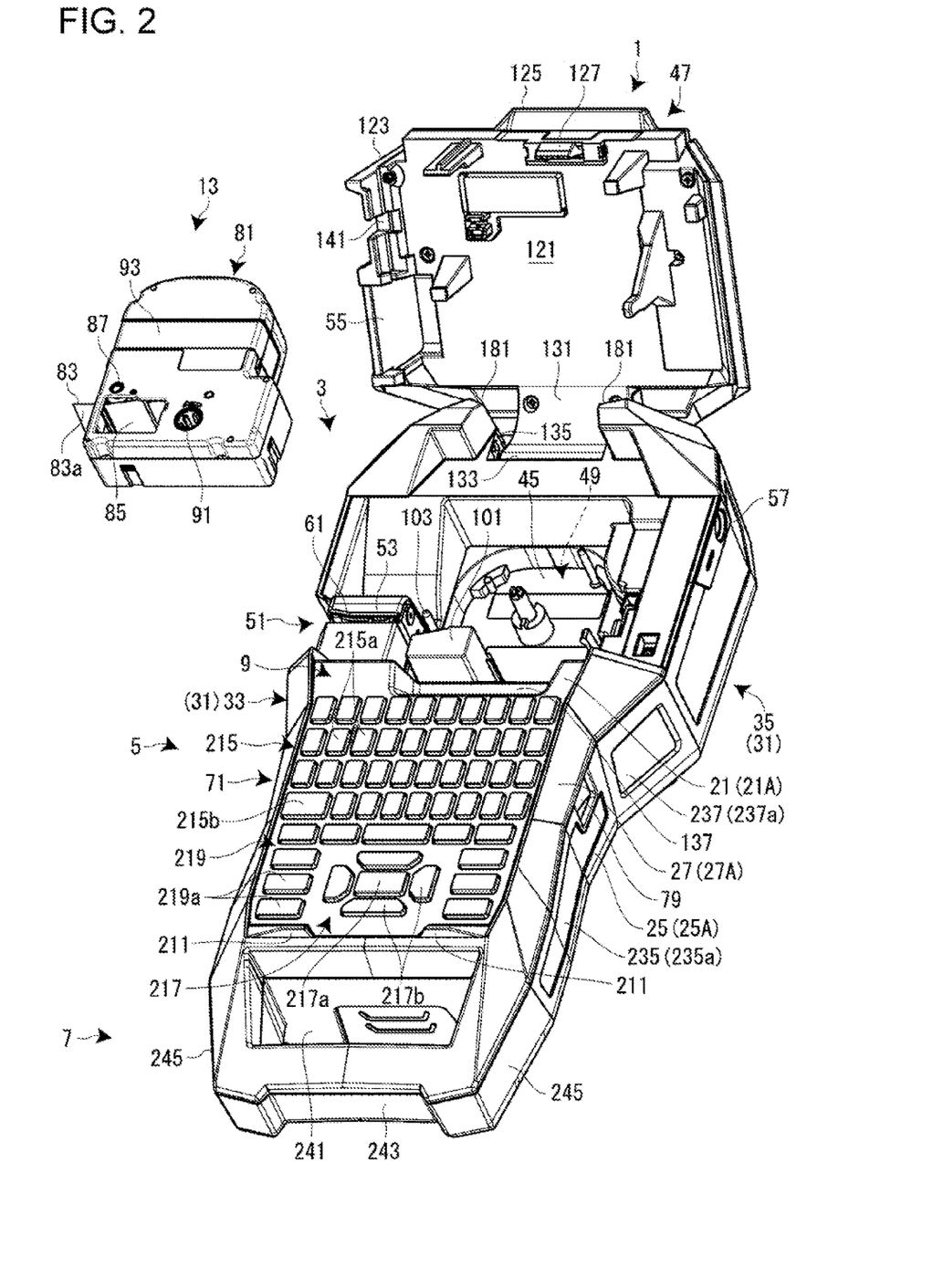
FIG. 2 is an exterior perspective view of the tape printing device of the embodiment when obliquely seen from a right top.
Figure 3:
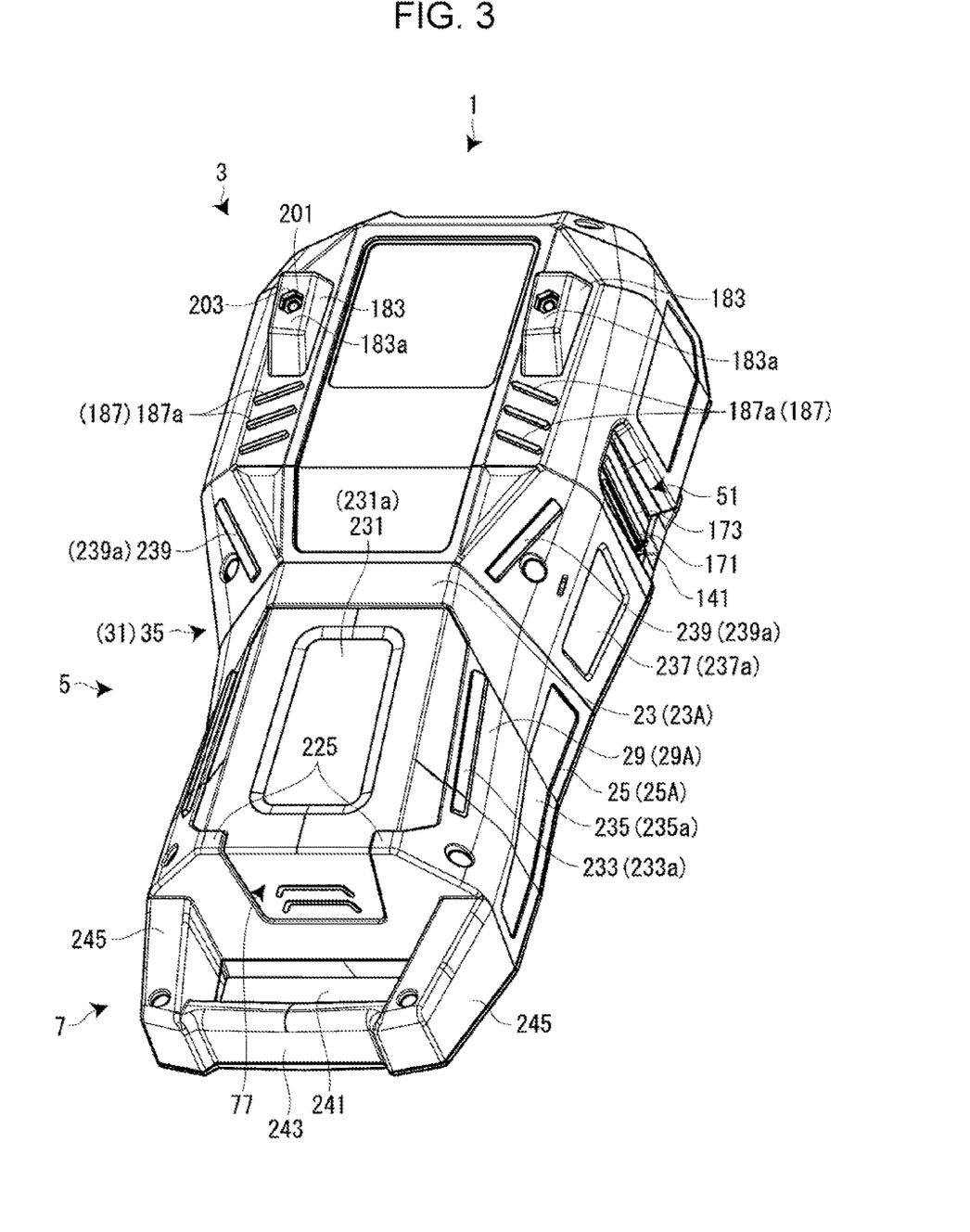
FIG. 3 is an exterior perspective view of the tape printing device of the embodiment when obliquely seen from a left bottom.
Figure 4:
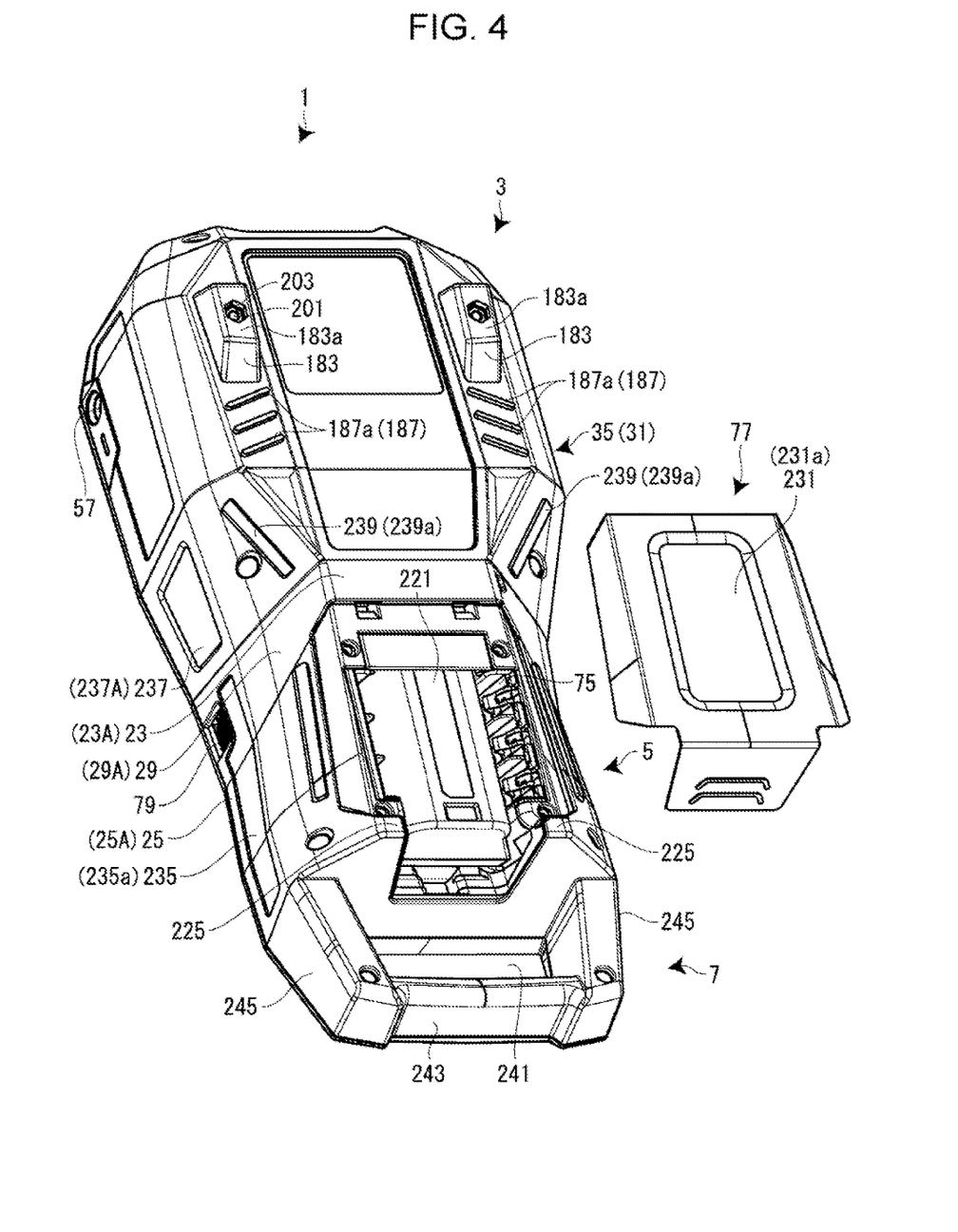
FIG. 4 is an exterior perspective view of the tape printing device of the embodiment when obliquely seen from a right bottom.
Figure 5:
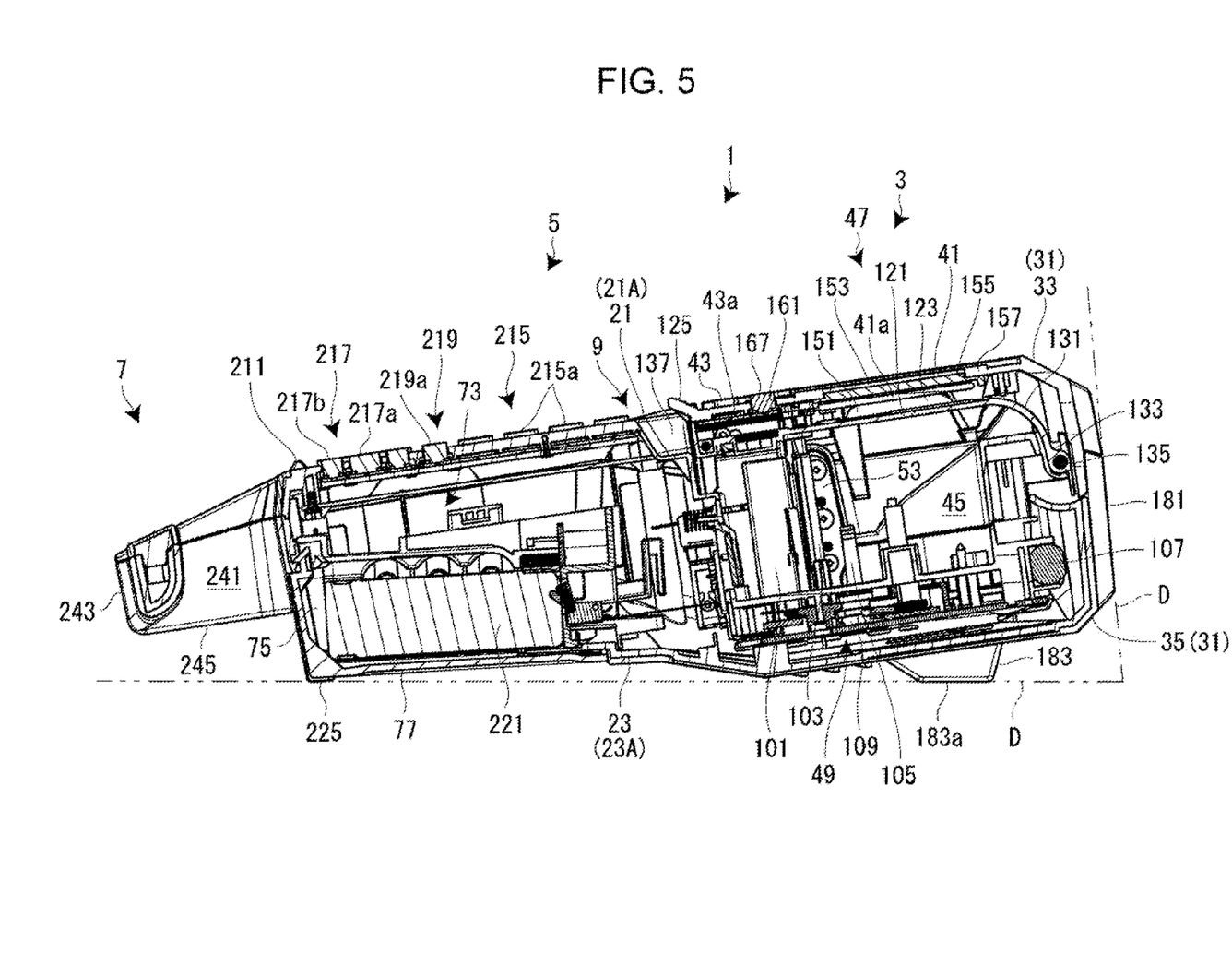
FIG. 5 is a vertical sectional view of the tape printing device of the embodiment in a longitudinal direction.

FIG. 1 is an exterior perspective view of a tape printing device of an embodiment when obliquely seen from a left top. FIG. 2 is an exterior perspective view of the tape printing device of the embodiment when obliquely seen from a right top. FIG. 3 is an exterior perspective view of the tape printing device of the embodiment when obliquely seen from a left bottom. FIG. 4 is an exterior perspective view of the tape printing device of the embodiment when obliquely seen from a right bottom. FIG. 5 is a vertical sectional view of the tape printing device of the embodiment in a longitudinal direction.

In addition, in a following description, with reference to FIG. 1, a front side of a longitudinal direction of the tape printing device is referred to as a "front" side or a "base end" side, and a tip side is referred to as a "tip" side or a "tip end" side. That is, a long horizontal length of the tape printing device is a longitudinal direction in FIG. 1, a lower side of a paper surface in the longitudinal direction is a "front" side or a "base end" side, and an upper side of the paper surface is a "tip" side or a "tip end" side. In addition, a direction orthogonal to the longitudinal direction is referred to as a "width" direction or a "horizontal" direction.

As illustrated in the drawing, a tape printing device 1 is formed to have a thick thickness and a wide width, and is provided with a main mechanism portion 3 which is formed on a tip end side of the tape printing device 1. The tape printing device 1 is provided with a handling portion 5 (handheld supporting portion) which is connected to the tip end side of the main mechanism portion 3 and a base end side of an opposite side and is formed to have a thinner thickness and a narrower width than those of the main mechanism portion 3. The tape printing device 1 is provided with a handholding portion 7 connected to a base end side of the handling portion 5. Also, the main mechanism portion 3, the handling portion 5, and the handholding portion 7 are vertically long and integrally formed. In addition, an operation panel 9 (displaying portion and operating portion) is disposed on the entire front surface of the tape printing device 1 throughout the handling portion 5 from the main mechanism portion 3. That is, the tape printing device 1 is formed to be integral with the main mechanism portion 3 positioned on a tip end side of the longitudinal direction, the handling portion 5 positioned on an intermediate side, and the handholding portion 7 positioned on the base end side. Also, the entire front surface of the tape printing device 1 is set to be the operation panel 9. In other words, in the longitudinal direction of the tape printing device 1, the main mechanism portion 3 is positioned on the tip end side, the handholding portion 7 is positioned on the base end side, and the handling portion 5 is positioned on the intermediate side.

Meanwhile, an outer shell of the tape printing device 1 is formed to be vertically long so that a ratio between the entire width and length is approximately 1:2. In addition, detailed description will be described later, but the gravity center of the tape printing device 1 is positioned to be closer to the main mechanism portion 3 side than the intermediate position of the longitudinal direction. The tape printing device 1 configured in such a manner is handheld so as to be surrounded by one hand or both hands from a rear side using the handling portion 5, and operations such as inputting, editing, and printing are performed by the operation panel 9 in this state. In addition, the tape printing device 1 is handheld and carried in hand by holding the handholding portion 7 part in hand.

Regarding the entirety of the tape printing device 1, in addition to a peripheral surface 25 including a front surface 21 (front surface of device), a rear surface 23 (rear surface of device), and a side surface (side surface of device), the outer shell thereof is constituted by a front side inclined peripheral surface 27 between the front surface 21 and the peripheral surface 25, and a rear side inclined peripheral surface 29 between the rear surface 23 and the peripheral surface 25. That is, the outer shell of the tape printing device 1 is designed to be an intermediate design of an angular design and a rounded design. In addition, regarding the outer shell of the tape printing device 1, in a plan view, the handling portion 5 is formed to be a constricted shape. Detailed description thereof will be described later, but the intermediate design and the constricted shape in the handling portion 5 have a function of a combination of ease of holding and difficulty of slipping.

Such an outer shell of the tape printing device 1 is mainly configured with a device case 31, an opening/closing lid 47, and a battery lid 77 to be described later. The device case 31 includes an upper case 33 like a lid case and a lower case 35 like a main body case. Also, the front surface 21 and the front side inclined peripheral surface 27 described above are constituted by the upper case 33, and the rear surface 23, the rear side inclined peripheral surface 29, and the peripheral surface 25 are constituted by the lower case 35.

The tape printing device 1 that appears such an exterior is provided in two installation manners, such that the tape printing device is flatly placed on an installation surface, for example, a desk D by setting the rear surface 23 side to be bottom, or is flatly placed on the desk D by setting a tip end of the main mechanism portion 3 to be bottom (refer to FIG. 5). The tape printing device 1 flatly placed on the desk D is considered to be operated on the desk D with the operation panel 9 which is inclined so that a tip thereof rises. The tape printing device 1 vertically placed is considered to be installed and stored on a narrow desk D when the device is assumed to be connected to a personal computer.

In addition, detailed description thereof will be described later, but a magnet attachment 11 (magnet portion) is detachably mounted in the tape printing device 1 (refer to FIG. 8). The tape printing device 1 (printing device main body) in which the magnet attachment 11 is mounted also can be installed by being adsorbed to an object of a magnetic material. Also, regarding such an installation manner, in order for the device to be able to be stably mounted, the gravity center of the tape printing device 1 is designed to be positioned on nearer the main mechanism portion 3 than an intermediate position of the longitudinal direction, that is, at the vicinity of a boundary between the main mechanism portion 3 and the handling portion 5, in a state in which a battery 221 to be described later is mounted.

As a part of the operation panel 9, a display portion 41 (displaying portion) is widely provided on the front surface 21 of the main mechanism portion 3, and a sub-keyboard portion 43 (operating portion) is provided thereon so as to be adjacent to the display portion 41. In addition, in the main mechanism portion 3, a cartridge mounting portion 45 for detachably mounting the tape cartridge 13 is formed to be recessed, and the opening/closing lid 47 which opens and closes the cartridge mounting portion 45 is provided (refer to FIG. 2). In the tape printing device 1 of the embodiment, the display portion 41 and the sub-keyboard portion 43 are disposed on the front side of the opening/closing lid 47.

In addition, a printing mechanism portion 49 (printing portion) which performs printing while feeding out the printing tape 83 from the tape cartridge 13 is disposed in the vicinity of the cartridge mounting portion 45 (refer to FIG. 5). Moreover, the cartridge mounting portion 45 and the opening/closing lid 47 may be provided on the rear surface 23 side of the main mechanism portion 3.

The tape discharging port 51 to which the printed printing tape 83 is discharged is provided on the peripheral surface 25 (left side surface) of a left side of the main mechanism portion 3 (refer to FIGS. 1 and 3). In addition, a cutter 53 which cuts a printed part of the printing tape 83 is built between the tape discharging port 51 and the cartridge mounting portion 45 (refer to FIG. 2). Further, a viewing window 55 for visually seeing the tape cartridge 13 mounted in the cartridge mounting portion 45 is provided near the tape discharging port 51 (refer to FIGS. 1 and 2). Meanwhile, a power supply connector 57 is provided on the peripheral surface 25 (right side surface) of a right side of the main mechanism portion 3 (refer to FIGS. 2 and 4).

Meanwhile, a main keyboard portion 71 (operating portion) in which character keys 215a, cursor keys 217b, and the like are disposed is provided on the front surface 21 of the handling portion 5 (refer to FIGS. 1 and 2). In addition, a power supply portion assembly 73 including a battery accommodating portion 75 is built in the handling portion 5 (refer to FIG. 5). Also, the battery lid 77 which opens and closes the battery accommodating portion 75 is provided on the rear surface 23 of the handling portion 5 (refer to FIG. 4). Further, a USB connecter 79 for constituting an interface with a personal computer is provided on the peripheral surface 25 (right side surface) of a right side of the handling portion 5 (refer to FIGS. 2 and 4).

[Configuration of Tape Cartridge]

As illustrated in FIG. 2, the tape cartridge 13 is configured to mount the printing tape 83, an ink ribbon 85, and a platen roller 87 inside a cartridge case 81. When the tape cartridge 13 is mounted on the cartridge mounting portion 45, a winding core 91 of the platen roller 87 and the ink ribbon 85 is engaged with the printing mechanism portion 49, and power from the printing mechanism portion 49 can be transmitted. Meanwhile, as the tape cartridge 13, various types of the printing tape 83 having different widths, materials, tape colors, and the like are prepared. Also, a strip-shaped identification label 93 indicating the types of the printing tape 83 is attached to the cartridge case 81 from the front throughout the side surface.

[Configuration of Main Mechanism Portion]

The main mechanism portion 3 is a part in which the tape cartridge 13 is mounted, and various mechanisms such as the printing mechanism portion 49 which performs printing on the printing tape 83 are built in the main mechanism portion 3. In addition, the display portion 41 or the like which becomes a part of the operation panel 9 described above is disposed on the front surface of the main mechanism portion 3.

As illustrated in FIG. 2, the printing mechanism portion 49 described above is provided in the vicinity of the cartridge mounting portion 45 in which the tape cartridge 13 is mounted. The printing mechanism portion 49 includes a thermal type printing head 101 (covered with a cover in the drawing), a platen driving shaft 103 engaged with the platen roller 87, and a winding driving shaft 105 engaged with the winding core 91, and is provided upright in the cartridge mounting portion 45. In addition, the printing mechanism portion 49 includes a motor 107 and a gear row 109, and the like transmitting power to the platen driving shaft 103 or the winding driving shaft 105, and these components are provided in a lower side space of the cartridge mounting portion 45 (refer to FIG. 5). Further, a head release mechanism (not illustrated) for rotating a printing head 101 between a printing position and a non printing position is built in the vicinity of the cartridge mounting portion 45, in conjunction with opening and closing of the opening/closing lid 47.

When the tape cartridge 13 is mounted in the cartridge mounting portion 45, the platen roller 87 is engaged with the platen driving shaft 103, and the winding core 91 is engaged with the winding driving shaft 105. Subsequently, when the opening/closing lid 47 is closed, the printing head 101 is rotated so as to pinch the printing tape 83 and the ink ribbon 85 between the platen roller 87 (printing position) and the printing head. Accordingly, the tape printing device 1 becomes in a print waiting state.

Moreover, a slit-shaped tape discharging path 61 is provided between the cartridge mounting portion 45 and the tape discharging port 51 described above, and the cutter 53 described above is built in a part of the tape discharging path 61 (refer to FIG. 2). In addition, the printed part of the printing tape 83 being sent from the tape discharging port 51 is sent in a state in which the printed surface 83a is toward the front side with a positional relationship between the tape cartridge 13 and the printing head 101 in the cartridge mounting portion 45 (refer to FIG. 1). That is, at the time of holding and operating the handling portion 5, the printed surface 83a is discharged to the handholding portion 7 side so that a user easily checks a printed result.

As illustrated in FIGS. 2 and 5, the opening/closing lid 47 is provided in the cartridge mounting portion 45 so as to open and close the cartridge mounting portion, and the opening/closing lid 47 is opened and closed around the center of an inner side. The opening/closing lid 47 includes a lid main body 121 which covers an upper space of the main mechanism portion 3 including the cartridge mounting portion 45, a lid cover 123 which covers the lid main body 121 to be enclosed, a finger hooking portion 125 which is provided on a front side end portion of the lid cover 123, and a closing hook 127 which is positioned near the finger hooking portion 125 and provided on the lid main body 121. In addition, the opening/closing lid 47 includes a lid supporting portion 131 which extends to be bent from the lid main body 121 toward the inner side, and a cylindrical hinge receiving portion 133 which is provided on a tip end portion of the lid supporting portion 131. Meanwhile, corresponding to the hinge receiving portion 133, a hinge shaft 135 is provided in the upper case 33 (refer to FIG. 6).

The finger hooking portion 125 is positioned at a boundary part between the main mechanism portion 3 and the handling portion 5, extends in a horizontal width direction, and protrudes toward an inclined base end side (refer to FIG. 1). In addition, corresponding to the finger hooking portion 125, a dent portion 137 is provided on a front surface of a tip end portion of the handling portion 5. A user puts his or her finger between the dent portion 137 and the finger hooking portion 125, and lifts the finger hooking portion 125 so as to open the opening/closing lid 47. Meanwhile, at the time of opening and closing the opening/closing lid 47, the closing hook 127 is appropriately bent, and disengages with the upper case 33 of the handling portion 5 side. Moreover, the finger hooking portion 125 protrudes over the display portion 41 or the sub-keyboard portion 43 (refer to FIG. 5), and detailed description thereof will be described later, but also functions as a protector of the display portion 41 or the sub-keyboard portion 43.

The lid supporting portion 131 and the hinge receiving portion 133 are formed to have a narrow width with respect to the lid main body 121, and the lid supporting portion 131 extends to be bent like an "L" shape toward a position of the peripheral surface 25 of the tip end side (refer to FIG. 5). Detailed description thereof will be described later, but a pair of right and left seat portions for vertically placing 181 for being vertically placed is provided to protrude from the tip end of the main mechanism portion 3, and the lid supporting portion 131 and the hinge receiving portion 133 are disposed on a space between the pair of seat portions for vertically placing 181 (refer to FIG. 7). Accordingly, the opening/closing lid 47 can be largely opened without receiving interference of the right and left seat portions for vertically placing 181.

Figure 6:
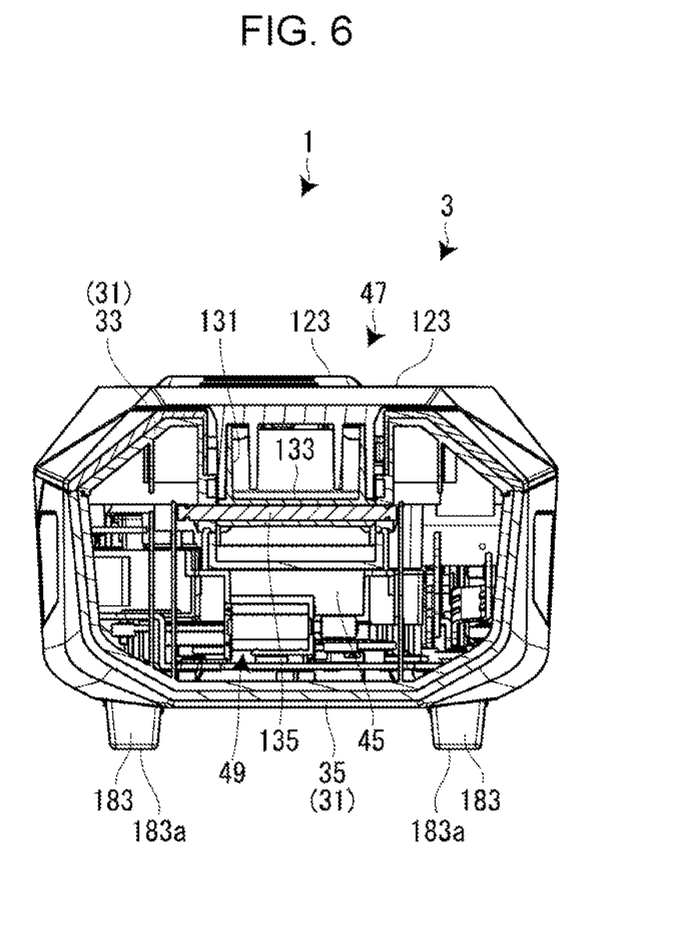
FIG. 6 is a horizontal sectional view of a main mechanism portion of the tape printing device of the embodiment in a width direction.

Meanwhile, the hinge shaft 135 is inserted into the hinge receiving portion 133, and in this state, both end portions are fixed to the upper case 33 (refer to FIG. 6). The hinge shaft 135 and the hinge receiving portion 133 are fitted to each other so as to generate appropriate rotation load, and the opening/closing lid 47 is configured to be able to stop at an arbitrary position in the opening and closing operation.

As illustrated in FIGS. 1 and 2, the lid cover 123 largely covers the lid main body 121, and constitutes a part of the outer shell of the tape printing device 1. That is, the lid cover 123 includes a lid front surface 123a which is a part of the front surface 21 of the tape printing device 1, and a lid inclined surface 123b which is a part of the front side inclined peripheral surface 27. Also, the viewing window 55 described above is formed on the left side lid inclined surface 123b. The viewing window 55 is formed in a trapezoidal shape, and made of a translucent resin. When looking at the cartridge mounting portion 45 through the viewing window 55, it is possible to check whether or not the tape cartridge 13 is mounted, and to visually see the identification label 93 of the mounted tape cartridge 13.

In addition, a "U" shaped notch portion 141 positioned near the front side of the viewing window 55 is formed on the lid cover 123. Detailed description thereof will be described later, but the tape discharging port 51 is provided to be recessed in a "U" shape on the peripheral surface 25 (left side surface) of a left side of the main mechanism portion 3, and the notch portion 141 is provided to be recessed thereon so as to follow the tape discharging port 51. As described above, the printing tape 83 is sent from the tape discharging port 51 in a state in which the printed surface 83*a* is positioned toward the front side. However, since the tape discharging port 51 is recessed, the printed result is difficult to be checked, but the printed result can be checked from an oblique upper side by the notch portion 141 (refer to FIG. 1).

In the display portion 41, a main portion 41*a* including a substrate is disposed on a space inside lid 151 between the lid main body 121 and the lid cover 123, and a main body front surface portion 153 is disposed to be exposed from a display opening portion 155 formed on the lid cover 123 (refer to FIG. 5). The main body front surface portion 153 of the display portion 41 is formed in an oblong rectangular shape, and correspondingly, the display opening portion 155 is also formed in a rectangular shape. In addition, an opening edge portion 157 (display frame portion) of the display opening portion 155 in the lid cover 123 is formed in a picture frame shape, and slightly protrudes with respect to the front surface of the main body front surface portion 153 (refer to FIG. 1). Detailed description thereof will be described later, but the opening edge portion 157 functions as a protector of the display portion 41 (main body front surface portion 153).

In the same manner, in the sub-keyboard portion 43, the main portion 43*a* including the substrate is disposed on the space inside lid 151 between the lid main body 121 and the lid cover 123, and each key is disposed to be exposed from a plurality of key opening portions 161 formed on the lid cover 123 (refer to FIG. 5). A plurality of keys disposed on the sub-keyboard portion 43 are configured with various selection keys 167 in addition to a power supply key 163 on a right inner side and a cutter key 165 of a left inner side.

As illustrated in FIGS. 1 and 3, the tape discharging port 51 is provided to be recessed in a "U" shape on the peripheral surface 25 (left side surface) of a left side of the main mechanism portion 3. The tape discharging port 51 includes a slit-shaped discharge opening portion 171 connected to the tape discharging path 61 described above, and an edging portion 173 which makes the discharge opening portion 171 be edged therewith. In the discharge opening portion 171, an upper end portion thereof is opened following the tape discharging path 61, and the edging portion 173 following that is formed a "U" shape. In addition, the edging portion 173 is made of a resin of a fluorescent color (yellow green fluorescent color in this embodiment) so that the tape discharging port 51 is conspicuous. Accordingly, attention can be attracted not to be an installation manner in which the tape discharging port 51 comes into contact with an obstacle.

As described above, the tape printing device 1 of the embodiment is configured to be able to be flatly and vertically placed. Therefore, a pair of seat portions for vertically placing 181 for being vertically placed are provided to protrude from the peripheral surface 25 of the tip end side of the main mechanism portion 3 which is the tip end side of the tape printing device 1, and a pair of seat portions for flatly placing 183 for being flatly placed is provided to protrude from the rear surface 23.

Figure 7:
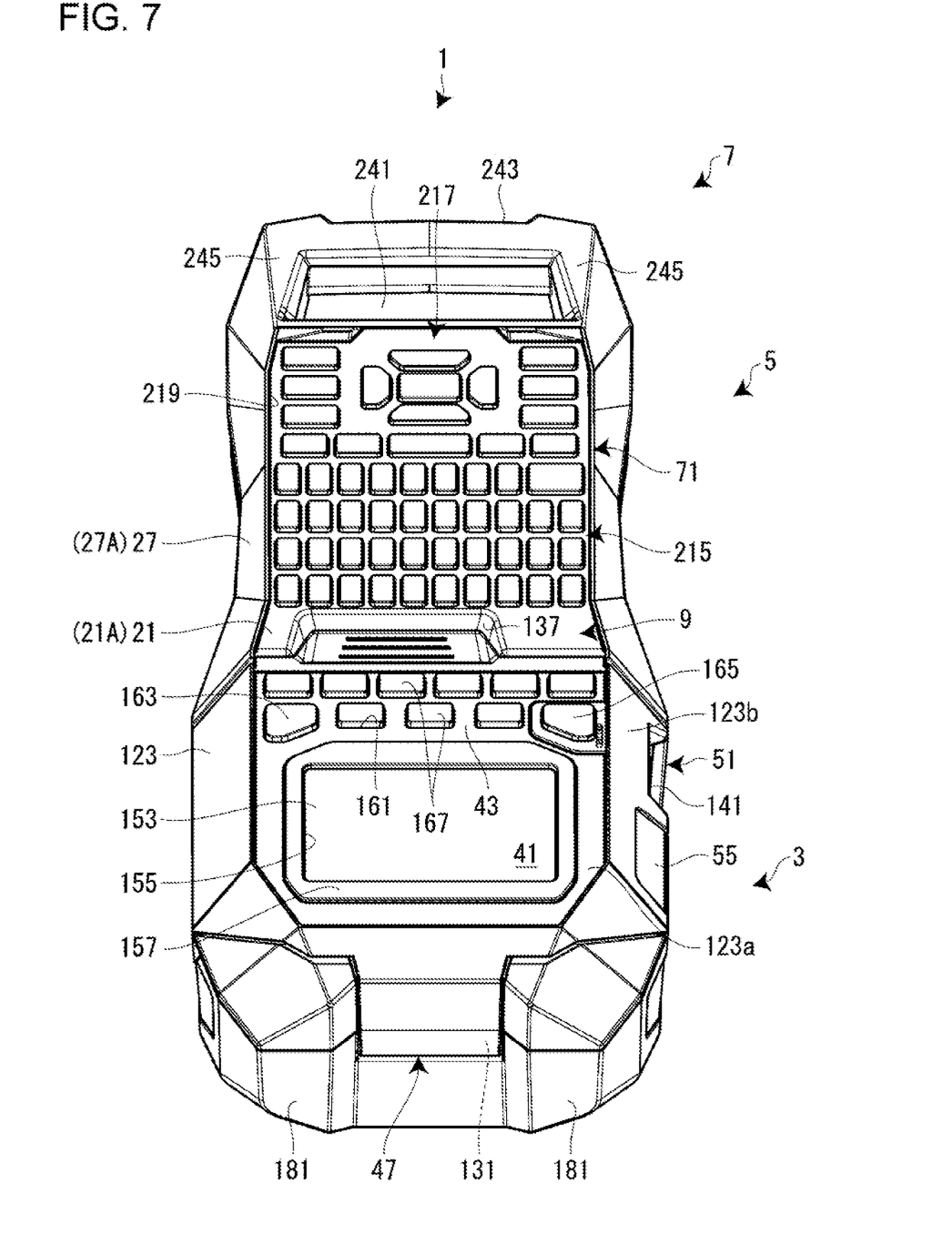
FIG. 7 is an exterior perspective view of the tape printing device of the embodiment when seen from a tip end side.

As illustrated in FIG. 7, the pair of seat portions for vertically placing 181 pinches the lid supporting portion 131 of the opening/closing lid 47 described therebetween so as to protrude from both sides thereof. The tip end portion of the main mechanism portion 3 is designed like an ear shape, and the pair of seat portions for vertically placing 181 is adopted as such an ear-shaped part. If the tape printing device 1 is vertically placed, the pair of seat portions for vertically placing 181 is seated on the desk D, and the tape printing device 1 is provided on the handholding portion 7 in a state of being stand up (refer to FIG. 5). Since the gravity center of the tape printing device is positioned on the tip end side further than an intermediate position of in the longitudinal direction, the tape printing device 1 of the embodiment is stably mounted even in a state of being vertically placed.

As illustrated in FIGS. 3 and 4, a pair of seat portions for flatly placing 183 is disposed on a tip end near the rear surface 23 of the main mechanism portion 3 so as to be horizontally separated from each other. Regarding flat placement of the tape printing device 1, the pair of seat portions for flatly placing 183 and a pair of sub-seating portions 225 of the handling portion 5 to be described later are seated on the desk D (refer to FIG. 5). Each seat portion for flatly placing 183 is formed in a trapezoidal shape when seen from the side surface, and includes an inclined seating surface 183*a* following a surface of the desk D flatly placed.

Also, in a state in which the tape printing device 1 is flatly placed as described above, the operation panel 9 is inclined so that the tip rises, a lower surface side slightly rises, and thus fingers can be inserted therein at the time of picking it up by being handheld. In this case, in a case in which the tape printing device 1 is flatly placed, the seat portions for flatly placing 183 are designed so that an angle between the desk D and the display portion 41 (operation panel 9) is approximately 8 degrees. Accordingly, visibility of the display portion 41 or the like at the time of flatly placing the tape printing device 1 can be improved.

In addition, a pair of sixth non-slipping portions 187, which is positioned near the front side of the pair of seat portions for flatly placing 183, is disposed on the rear surface 23 of the main mechanism portion 3. Each sixth non-slipping portion 187 is constituted by three projections 187*a* which are mutually parallel. Also, the pair of sixth non-slipping portions 187 obliquely extends to be entirely formed in an inverted "V" shape. Detailed description thereof will be described later, but the three projections 187*a* are parts where a first finger is in contact at the time of holding the tape printing device 1 in hand, and function as preventing slipping of the first finger.

[Configuration of Magnet Attachment]

Figure 8:
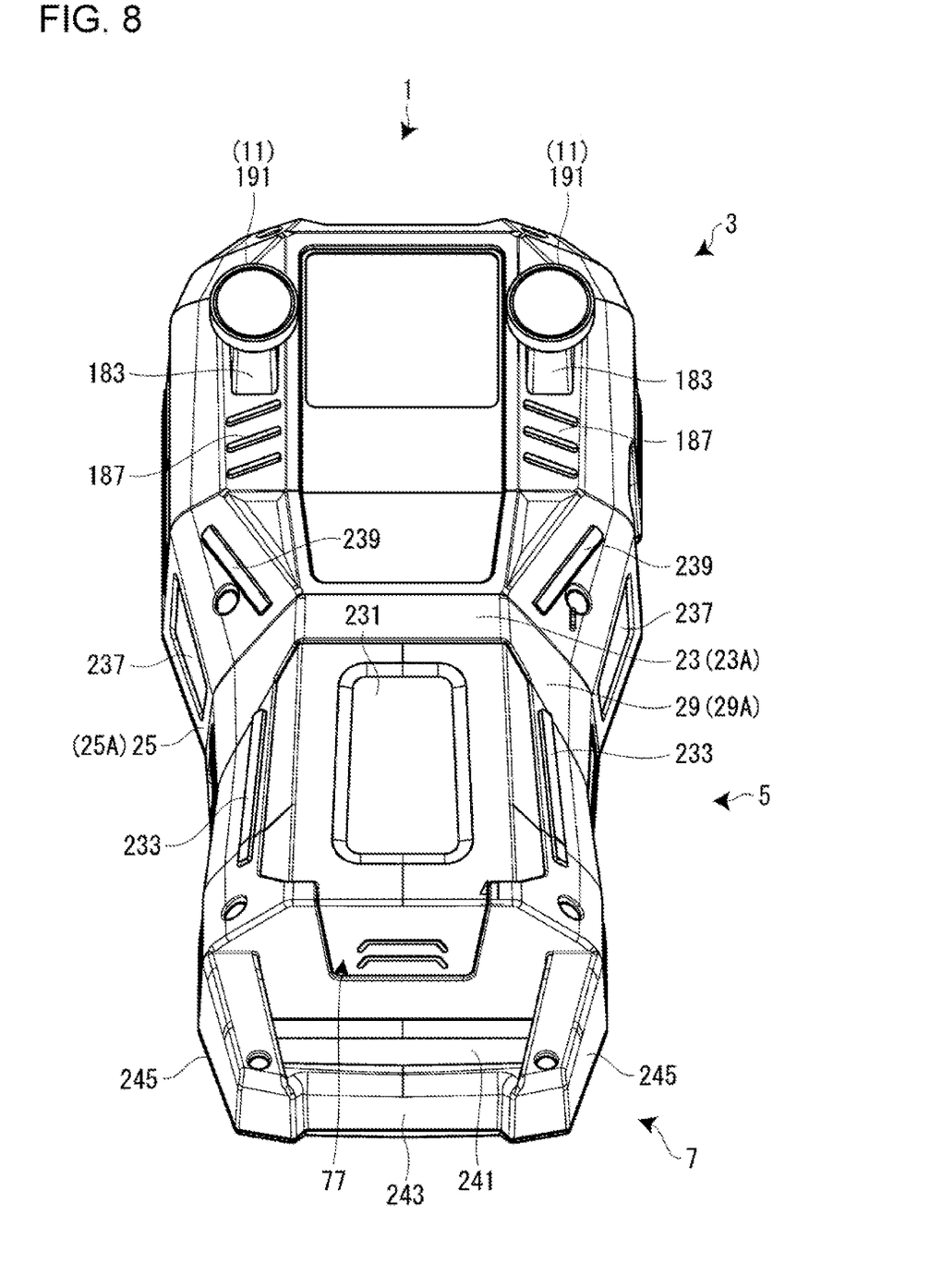
FIG. 8 is an exterior perspective view of the tape printing device in which a magnet attachment is mounted when seen from the bottom.
Figure 9:
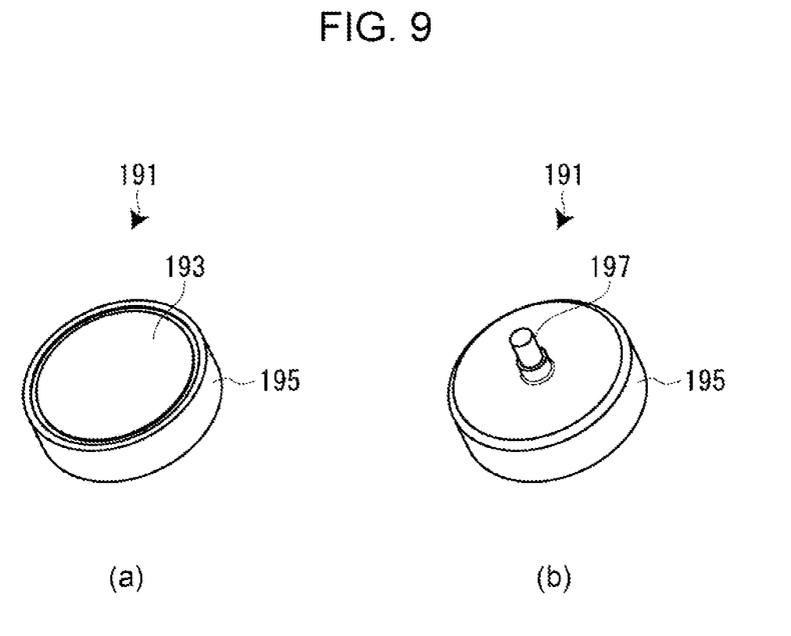
FIG. 9 is a structure view of the magnet attachment.

As illustrated in FIGS. 8 and 9, the magnet attachment (magnet portion) is detachably mounted on the pair of seat portions for flatly placing 183 described above. That is, the pair of seat portions for flatly placing 183 serves as a pedestal for attaching the magnet attachment 11. The magnet attachment 11 is constituted by a pair of magnets 191 corresponding to the pair of seat portions for flatly placing 183. The gravity center of the tape printing device 1 described above is positioned nearer the main mechanism portion 3 than the intermediate position of the longitudinal direction, and the pair of magnets 191 is positioned nearer the main mechanism portion 3 than the intermediate position of the longitudinal direction. Therefore, an adsorbing posture of the tape printing device 1 can be stabilized. Each magnet 191 includes a disc-shaped magnet main body 193 made of a ferrite magnet or the like, a bottomed cylindrical yoke 195 in which the magnet main body 193 is accommodated, and a male screw 197 which protrudes from a center portion of a lower surface of the yoke 195.

Meanwhile, in the seat portions for flatly placing 183, a female screw 201 into which the described-above male screw 197 is screwed is embedded in the center portion of the seating surface 183*a* thereof (refer to FIGS. 3 and 4). The male screw 197 is constituted by a stepped screw, and the female screw 201 is embedded in a hexagonal guide hole 203. When the magnet 191 is grabbed, and the male screw 197 thereof is screwed into the female screw 201 of the seating surface 183*a*, a base portion of the male screw 197 fits into the guide hole 203. Further, as the male screw is further screwed into the female screw, a lower surface of the yoke 195 comes into pressure-contact with the seating surface 183*a*, whereby the mounting of the magnet 191 on the seat portions for flatly placing 183 is completed. Moreover, it is preferable that a knurling process or the like as a non-slip process be executed on an outer peripheral surface of the yoke 195.

The tape printing device 1 in which the magnet attachment 11 is mounted, for example, is adsorbed to a case of a steel control panel. That is, the tape printing device 1 can be installed in an object to be installed which is a magnetic material with a degree of freedom through the magnet attachment 11. Moreover, in order for a front surface of the object to be installed not to be damaged due to the adsorbed magnet 191, it is preferable that the magnet 191 be covered with a film member such as a cap (not illustrated). Accordingly, even when dust including a magnetic material is attached to the front surface of the magnet 191 (film member), the dust can be easily removed.

[Configuration of Handling Portion]

The handling portion 5 is a part which is operated by being handheld such as inputting in the tape printing device 1 to be handheld. In consideration of a weight balance of the tape printing device 1 at the time of being handheld, the battery 221 is built in this part (refer to FIGS. 4 and 5).

As illustrated in FIGS. 1 and 2, the main keyboard portion 71 which constitutes a part of the operation panel 9 is provided on the entirety of the front surface 21 of the handling portion 5. In addition, a pair of right and left protruding pieces 211 (protruding portion) is provided on the front surface 21 of the base end portion of the handling portion 5. Each protruding piece 211 extends in a horizontal direction, and protrudes over the main keyboard portion 71. Accordingly, in the same manner as the finger hooking portion 125 described above, the protruding piece functions as a protector of the main keyboard portion 71.

That is, the finger hooking portion 125 and a pair of protruding pieces 211 are respectively positioned on a tip end and a base end of the handling portion 5, and constitute two protruding parts in the operation panel 9. Therefore, in a case in which the tape printing device 1 is reversed upside down and placed on the desk D, the finger hooking portion 125 and the pair of protruding pieces 211 are landed on the desk D, and the display portion 41 which constitutes the operation panel 9 protects the sub-keyboard portion 43 and the main keyboard portion 71 so that these portions do not directly come into contact with the desk D. In the same manner, the opening edge portion 157 of the opening/closing lid 47 individually protects the display portion 41. Moreover, such a protruding part may be positioned on the tip end portion in the main mechanism portion 3.

A group of a plurality of keys is disposed on the main keyboard portion 71. The group of the plurality of keys is configured with the group of character keys 215 which is disposed on a part of a half of the tip end side and a group of cursor and execution keys 217 and a group of function keys 219 which is disposed on a part of a half of the base end side. Needless to say, the group of character keys 215 has a higher frequency of operations than that of the group of cursor and execution keys 217 and the group of function keys 219. Here, in consideration of operability in a state of being handheld, the group of character keys 215 having a high frequency of operations is disposed near the gravity center of the tape printing device 1, and the group of cursor and execution keys 217 and the group of function keys 219 having a low frequency of operations are respectively disposed on a position close to and a position distant from the gravity center.

As a handheld operation of the main keyboard portion 71, in a case in which the tape printing device 1 is grabbed by one hand to be supported and key operations are performed by the other hand, a case is assumed that both hands support the tape printing device 1, and the key operations are performed by thumbs of the both hands. Here, in consideration of a case in which the key operations are performed by the thumbs of the both hands, the keys particularly in the group of character keys 215 are disposed to be substantially symmetrical. In addition, it is not particularly illustrated, but in order to be capable of distinguishing the group of character keys 215, the group of cursor and execution keys 217, and the group of function keys 219 by a color, coloring is differently performed on a character display provided on a front surface of each key for each key group.

In addition, a character or a reference number associated with a main function and a sub-function of each of keys is disposed on a key top of the group of character keys 215, the group of cursor and execution keys 217, and the group of function keys 219 (not illustrated at all). Each key is colored in order to maximize a brightness difference between coloring of the key top and coloring of a character or a reference number associated with the main function. In addition, a brightness difference between the coloring of the characters or a reference number associated with the main function and the coloring of a character or a reference number associated with the sub-function is preferably approximately 40% degree in a case in which a brightness difference between the minimum and the maximum is represented by a percentage. Accordingly, even if each key is small, the main function and the sub-function included in the key can be easily visually seen.

The group of character keys 215 includes a plurality of character keys 215*a* which are disposed in a matrix shape at intervals to each other, and a shift key 215*b* beside the left hand. In this case, the character keys 215*a* is formed to be vertically long in order to suppress an erroneous operation and to suppress the width of the entirety of the group of character keys 215. The group of cursor and execution keys 217 includes an execution key 217*a*, and four cursor keys 217*b* disposed to surround the execution key 217*a*. In addition, the group of function keys 219 includes a plurality of function keys 219*a* so as to surround three sides of the group of cursor and execution keys 217.

As illustrated in FIGS. 4 and 5, the battery accommodating portion 75 which accommodates the battery 221, and the battery lid 77 which opens and closes the battery accommodating portion 75 are provided on the rear surface 23 side of the handling portion 5. The chargeable battery 221 (battery) is detachably mounted in the battery accommodating portion 75. A base end side of the battery accommodating portion 75 is largely cut away from the device case 31 (lower case 35), and the user detaches the battery 221 from the opened part of a front of the case. Also, the battery lid 77 is formed in a shape following the opened part of the battery accommodating portion 75 including the opened part of the front side.

As described above, the outer shell of the tape printing device 1 is configured with the front surface 21, the rear surface 23, the peripheral surface 25, the front side inclined peripheral surface 27, and the rear side inclined peripheral surface 29, and in the handling portion 5, a periphery thereof is configured with a handling portion front surface 21A, a handling portion rear surface 23A, right and left handling portion side surfaces 25A, right and left handling portion front inclined surfaces 27A, and right and left handling portion rear inclined surfaces 29A (refer to FIGS. 1 to 4). The handling portion front surface 21A is configured with the main keyboard portion 71 described above, and parts of the handling portion rear surface 23A and the handling portion rear inclined surfaces 29A are configured with the battery lid 77.

Moreover, in the base end portion of the handling portion rear surface 23A, a pair of sub-seating portions 225 is formed on both sides of the battery lid 77. The sub-seating portion 225 more slightly protrudes than the battery lid 77. As described above, when the tape printing device 1 is flatly placed, the pair of sub-seating portions 225 and the pair of seat portions for flatly placing 183 described above are seated on the desk D (refer to FIG. 5).

The outer shell of the handling portion 5 is formed to be constricted when seen from the upper side. Specifically, in the handling portion 5, a part corresponding to the group of character keys 215 is the narrowest constricted, another part is widely opened from the part toward the main mechanism portion 3 at a steep angle, and is widely opened toward the handholding portion 7 at a gentle angle. Accordingly, at the time of holding the tape printing device 1 in hand, a user can grab the device with feeling of fitting.

Further, regarding the handling portion front surface 21A, the handling portion rear surface 23A, the right and left handling portion side surfaces 25A, the right and left handling portion front inclined surfaces 27A, and the right and left handling portion rear inclined surfaces 29A, which constitute the periphery of the handling portion 5, mutual intersection parts thereof constitute a top portion at an obtuse angle, and thus these surfaces functions as preventing slipping, in a case in which the tape printing device 1 is handheld in a circumferential direction. Therefore, the handling portion 5 includes the outer shell which has ease of holding and difficulty of slipping.

In addition, a plurality of non-slippery parts in consideration of positions of fingers and the like at the time of holding the device in hand are provided in the periphery of the handling portion 5. In the handling portion rear surface 23A of the handling portion 5, the first non-slipping portion 231 is formed. The first non-slipping portion 231 is configured with a shallow groove portion 231a formed in the battery lid 77, and becomes a position of the little fingers or the third fingers at the time of grabbing the handling portion 5 with both hands (refer to FIGS. 3 and 4). That is, the little fingers or the third fingers are caught on an edge (step portion) of the groove portion 231a, and therefore, slippery is prevented. In this case, the first fingers of both hands come into contact with the pair of sixth non-slipping portions 187 described above.

In the same manner, a second non-slipping portion 233 is formed on each of the right and left handling portion rear inclined surfaces 29A. The second non-slipping portion 233 is configured with an elongated and low projection 233a, and extends along the battery lid 77 (refer to FIGS. 3 and 4). Bottom parts of the little fingers and the third fingers come into contact with the second non-slipping portion 233 at the time of grabbing the handling portion 5 with one hand. Even in this case, the first fingers come into contact with the sixth non-slipping portion 187.

The third non-slipping portions 235 are formed on each of the right and left handling portion side surfaces 25A. The third non-slipping portions 235 are configured with the shallow groove portion 235a. In addition, the tip end sides of the right and left handling portion side surfaces 25A are respectively adjacent to the third non-slipping portions 235, and a fourth non-slipping portion 237 is formed thereon (all is referred to FIGS. 1 to 4). Even in this case, the fourth non-slipping portion 237 is configured with a shallow groove portion 237a. When the handling portion 5 is grabbed by one hand, the thumb comes into contact with one third non-slipping portion 235, the little finger and the third finger come into contact with another third non-slipping portion 235, and a middle finger comes into contact with the fourth non-slipping portion 237.

In addition, a fifth non-slipping portion 239 is formed on each of the tip end sides of the right and left handling portion rear inclined surfaces 29A. In the same manner as the second non-slipping portion 233, the fifth non-slipping portion 239 is configured with an elongated low projection 239a (refer to FIGS. 3 and 4). When a person having small hands grabs the handling portion 5 with his or her one hand or both hands, his or her first fingers come into contact with the fifth non-slipping portion 239. That is, in a case of a person having big hands, his or her first fingers come into contact with the sixth non-slipping portion 187, and in a case of a person having small hands, his or her first fingers come into contact with the fifth non-slipping portion 239.

[Configuration of Handholding Portion]

The handholding portion 7 is a part to grab the tape printing device 1 so as to hang, and is used at the time of carrying the tape printing device 1.

As illustrated in FIGS. 2 and 4, the handholding portion 7 includes a finger inserting gap 241 to which a finger is inserted, a grip portion 243 facing a base end of the handling portion 5, and a pair of right and left grip supporting portions 245 which extends to a base end of the handling portion 5 from both ends of the grip portion 243. The pair of grip supporting portion 245 extends in a "V" shape toward a front side, and a pair of the grip supporting portions 245, the handling portion 5, and the grip portion 243 are integrally formed.

The grip portion 243 is grabbed so as to be gripped with a thumb in the outside and the four fingers attached to the finger inserting gap 241 side other than the thumb. A rear surface side of the grip portion 243 is formed in a circular arc sectional surface, and bellies of four fingers come into contact with this part. Accordingly, the grip portion 243 easy to hold is configured. In addition, the finger inserting gap 241 is a space into which four fingers are inserted at the time of grabbing the grip portion 243, a sufficient size gap is provided between the handling portion 5 and the finger inserting gap, and the finger inserting gap is formed in an inverted trapezoidal shape in a plan view, that is, is formed in a trapezoidal shape with the grip portion 243 side as an upper side. Accordingly, the grip portion 243 may be comfortably gripped. In addition, as described above, the finger inserting gap 241 also serves as a finger inserting gap at the time of attaching and detaching the battery 221 to and from the battery accommodating portion 75.

Further, the grip portion 243 is disposed near a front side so that a sufficient gap is generated between the desk D and the grip portion in a state of being flatly placed. Accordingly, a finger to grab or a finger grabbed the grip portion 243 is difficult to be in contact with the desk D, and at the time of being flatly placed, and the grip portion has a structure in which the grip portion 243 is easily grabbed or a hand easily releases from the grip portion 243.

[Operational Effect]

As described above, according to the tape printing device 1 of the embodiment, in the main keyboard portion 71, the group of character keys 215 which has a high frequency of operations is disposed at a position near the gravity center of the tape printing device 1, and the group of cursor and execution keys 217 and the group of function keys 219 which have a low frequency of operations are disposed at a position distant from the gravity center. Accordingly, a grabbing position to easy to hold in hand when considering a weight balance of the entire body and a grabbing position to easy to hold in hand when key-operating the group of keys having the high frequency of operations can be formed to approximately coincide with each other. That is, without moving the grabbing position of the tape printing device 1 in various operations, the various operations can be smoothly operated. Therefore, operability in the handheld operation can be improved.

Moreover, the position of the group of character keys 215 and the narrowest position having a constricted shape coincide with each other, and at this point, operability in the handheld operation can be improved.

CROSS REFERENCE TO RELATED APPLICATIONS

This application claims priority to Japanese Patent Application No. 2015-059221 filed on Mar. 23, 2015, the entire contents of which are incorporated by reference herein.

The invention claimed is:

1. A tape printing device that is vertically long and is able to be operated by being handheld, comprising:
a main key operating portion; and
a plurality of groups of keys positioned on the main key operation portion on a front surface of the tape printing device,
wherein the plurality of groups of keys comprises a first group of keys having a high frequency of operations and a second group of keys having a low frequency of operations,
wherein the first group of keys having a high frequency of operations is disposed at a position near to a center of gravity in a longitudinal direction of the tape printing device, and the second group of keys having a low frequency of operations is disposed at a position distant from the center of gravity in the longitudinal direction of the tape printing device.

2. The tape printing device according to claim 1, further comprising:
a handheld supporting portion that is configured to be handheld,
wherein the main key operating portion is disposed on a front surface of the handheld supporting portion, and
wherein the first group of keys having the high frequency of operations and the second group of keys having the low frequency of operations are disposed side by side in the longitudinal direction.

3. The tape printing device according to claim 1,
wherein the first group of keys having the high frequency of operations includes a group of character keys, and wherein the second group of keys having the low frequency of operations includes a group of cursor keys.

4. The tape printing device according to claim 3,
wherein a plurality of the character keys constituting the group of character keys are disposed with a gap therebetween and are each formed to be vertically long.

5. The tape printing device according to claim 1,
wherein a color of each of the plurality of groups of keys is different from each other.

6. A tape printing device that is vertically long and is able to be operated by being handheld, comprising:
a main key operating portion;
a plurality of groups of keys positioned on the main key operation portion on a front surface of the tape printing device,
wherein the plurality of groups of keys comprises a first group of keys having a high frequency of operations and a second group of keys having a low frequency of operations,
wherein the first group of keys having a high frequency of operations is disposed at a position near to a center of gravity in a longitudinal direction of the tape printing device, and the second group of keys having a low frequency of operations is disposed at a position distant from the center of gravity in the longitudinal direction of the tape printing device;
a cartridge mounting portion on which a tape cartridge is detachably mounted;
an opening/closing lid that opens and closes the cartridge mounting portion;
a displaying portion that is provided in the opening/closing lid; and
a sub-key operating portion that is provided in the opening/closing lid.

7. The tape printing device according to claim 6,
further comprising a hinge for opening and closing the opening/closing lid that includes a rotation load resisting blockage due to a weight itself of the opening/closing lid.

8. The tape printing device according to claim 6,
wherein the opening/closing lid includes a finger hooking portion for opening and closing the opening/closing lid, and
wherein the finger hooking portion protrudes from a front surface of the displaying portion and a front surface of the sub-key operating portion.

9. The tape printing device according to claim 2, wherein the tape printing device extends longitudinally between a distal end side and a base end side, wherein the center of gravity is positioned closer to the distal end side than the handheld supporting portion.

10. The tape printing device according to claim 1, wherein the center of gravity is closer to a printing mechanism portion of the tape printing device than the handheld supporting portion.

11. The tape printing device according to claim 1, wherein the center of gravity is closer to a display portion of the tape printing device than the handheld supporting portion.

12. The tape printing device according to claim 1, wherein the first group of keys is disposed to be substantially symmetrical.

13. The tape printing device according to claim 2, wherein an outer shell of the handheld supporting portion is formed to be constricted, the first group of keys is disposed at a narrowest constricted part.

* * * * *